(12) United States Patent
Clift et al.

(10) Patent No.: US 11,933,498 B2
(45) Date of Patent: Mar. 19, 2024

(54) AEROSPACE STRUCTURE METHODS OF MANUFACTURING

(71) Applicant: Venture Aerospace, LLC, Centennial, CO (US)

(72) Inventors: Vaughan Lennox Clift, Centennial, CO (US); Sasha Mela, Centennial, CO (US)

(73) Assignee: Venture Aerospace, LLC, Centennial, CO (US)

( * ) Notice: Subject to any disclaimer, the term of this patent is extended or adjusted under 35 U.S.C. 154(b) by 273 days.

(21) Appl. No.: 17/499,703

(22) Filed: Oct. 12, 2021

(65) Prior Publication Data

US 2022/0111569 A1 Apr. 14, 2022

Related U.S. Application Data

(60) Provisional application No. 63/091,230, filed on Oct. 13, 2020.

(51) Int. Cl.
*F23R 3/52* (2006.01)
*B29C 44/12* (2006.01)
(Continued)

(52) U.S. Cl.
CPC .................. *F23R 3/52* (2013.01); *F02C 9/26* (2013.01); *F23R 3/04* (2013.01); *F23R 3/26* (2013.01); *F23R 3/286* (2013.01); *B29C 44/1209* (2013.01); *B29C 44/1285* (2013.01); *B29C 70/48* (2013.01); *B29K 2063/00* (2013.01); *B29K 2075/00* (2013.01); *B29K 2105/04* (2013.01); *B29K 2105/08* (2013.01);
(Continued)

(58) Field of Classification Search
CPC ............ B29C 65/3496; B29C 65/3492; B29C 2049/2422; B29C 2049/2414; B29C 49/2408; B29C 49/24; B29C 45/37; B29C 45/14622; B29C 44/321; B29C 44/32; B29C 44/22; B29C 44/16; B29C 44/148; B29C 44/146; B29C 44/145; B29C 44/143; B29C 44/141; B29C 44/14; B29C 44/1285; B29C 44/129; B29C 44/1276; B29C 44/1228; B29C 44/08; B29C 44/06; B29C 44/12; B29C 43/183; B29C 2045/1724
See application file for complete search history.

(56) References Cited

U.S. PATENT DOCUMENTS 3,989,781 A * 11/1976 Chant .................... B29C 70/28
264/258
2009/0304962 A1 12/2009 Rodgers
(Continued)

OTHER PUBLICATIONS

International Searching Authority, International Search and Written Opinion, dated Feb. 14, 2022 in PCT/US 2021/054625.

*Primary Examiner* — Stella K Yi
(74) *Attorney, Agent, or Firm* — Critical Path IP Law, LLC

(57) ABSTRACT

Methods of manufacturing of aerospace structures are disclosed. More specifically, methods of manufacturing relatively lightweight yet strong aerospace structures. In one embodiment, the method includes the addition of a volume of a rigid and flexible polyurethane mixture into a mold to create a composite structure. In one aspect, the method includes the integration of special structures within a larger structure to remove traditionally structurally weak or vulnerable areas.

20 Claims, 2 Drawing Sheets

(51) Int. Cl.
  *B29C 70/48*      (2006.01)
  *B29K 63/00*      (2006.01)
  *B29K 75/00*      (2006.01)
  *B29K 105/04*     (2006.01)
  *B29K 105/08*     (2006.01)
  *B29K 307/04*     (2006.01)
  *B29K 705/02*     (2006.01)
  *B29L 31/30*      (2006.01)
  *F02C 9/26*       (2006.01)
  *F23R 3/04*       (2006.01)
  *F23R 3/26*       (2006.01)
  *F23R 3/28*       (2006.01)

(52) U.S. Cl.
  CPC ...... *B29K 2307/04* (2013.01); *B29K 2705/02* (2013.01); *B29L 2031/3076* (2013.01)

(56) References Cited

U.S. PATENT DOCUMENTS

| | | |
|---|---|---|
| 2011/0259514 A1 | 10/2011 | Boyle |
| 2012/0088864 A1 | 4/2012 | Wang |
| 2012/0237759 A1* | 9/2012 | Ehbing .................. B32B 5/08 |
| | | 156/60 |
| 2013/0260022 A1 | 10/2013 | Boyle |
| 2019/0315461 A1 | 10/2019 | Clift |

* cited by examiner

AEROSPACE STRUCTURE METHODS OF MANUFACTURING

CROSS-REFERENCE TO RELATED APPLICATION

This application is a nonprovisional patent application of and claims the benefit of U.S. Provisional Patent Application No. 63/091,230 titled "Aerospace Propulsion Technologies and Applications" filed Oct. 13, 2020, the disclosure of which is hereby incorporated herein by reference in entirety.

FIELD

The disclosure relates generally to methods of manufacturing of aerospace structures, and more specifically to methods of manufacturing relatively lightweight yet strong aerospace structures.

BACKGROUND

For many vehicles, especially aircraft or other aerospace vehicles, a method is needed for rapidly producing light weight, strong structures. These structures need to contain occupants and or control systems, cargo, batteries and fuel, for example. The structures also need to have robust anchor points to which components may be affixed, such as engines, landing gear, hatches and doors, seats and racks for electronics.

This is difficult to achieve and traditionally has involved tube and plate fabrication with various metals, commonly aluminum and steel, to produce frames, cross members, structural beams and plates. Over these structures is overlayed a skin, sometimes aluminum plate, sometimes composite materials such as carbon fiber/epoxy. In some variants a carbon fiber or similar composite shell is produced first with some embedded anchor mechanisms and the metal structures inserted.

Historically, wood and even coated paper or cloth have been used but are no longer viable. In modern aircraft, occasionally preformed rods or plates of carbon fiber composites are used. However, such structures still require machining and the junction between plates and rods is weaker than the rod or plate itself and often limited to the strength of the epoxy bond or bolts.

By and large, metal frame and composite skin structures are machined or fabricated separately and then combined. Even a relatively simple structure such as a tank or dome could take many man-hours to produce.

What is needed is a method of manufacturing a relatively light weight yet strong structure. The disclosure solves this need. A method of manufacturing a light weight yet strong structure is disclosed. In one embodiment, the method includes integration of special structures within the larger structure to remove traditionally structurally weak or vulnerable areas. Features and aspects of the method of manufacturing are described in greater detail below.

SUMMARY

The present disclosure can provide a number of advantages depending on the particular aspect, embodiment, and/or configuration.

The disclosure describes a specific combination of material selection and manufacturing process which are employed to dramatically simplify the production of even complex shapes with multiple anchoring points.

In its simplest form, epoxy impregnated carbon fiber may be draped and cured over various closed cell foams. The cell forms could be a variety of 3-dimensional shapes and could even be tapered at the edge to the minimum thickness of the layers of carbon fiber composite. The outer skin of cured carbon fiber composite could be flexed and contorted somewhat but is extremely difficult to stretch or elongate in the direction of the fibers. However, epoxy impregnated fiber structures, though strong for their weight, can be quite brittle when flexed to extremes.

The foam in isolation is relatively weak and brittle and segments could be easily snapped apart or dented. However, once entirely encapsulated by the "skin" described above, the foam becomes extremely difficult to compress and even more difficult to flex or bend as to do so requires elongating the carbon fiber along its strongest axis. Therefore, the encapsulated foam demonstrated greatly enhanced mechanical strength and could not be dented or snapped apart as before without hundreds of times more force.

A limitation of this approach is that it was difficult to mount structures to it as the foam inside was unchanged and therefore very weak and easily broken. It was possible to embed plates or bolt structures to the carbon fiber epoxy surface before it cured but it then was limited to the mechanical strength of the epoxy bond.

In order to solve this issue, it was realized that if a metal plate or shaped structure could be incorporated inside to foam like a skeleton then it might be able to distribute the forces of attached anchoring points across a larger area of the foam and therefore provide a more stable anchor. However, if the plate or metal structure had relatively smooth surfaces, the mechanical bond between such surfaces and the foam could be vibrated loose and the structure would float free within the foam and carbon fiber shell and therefore would not work.

A possible variant that could solve this issue is if the metal internal structure had projection like fingers that radiated out and made direct contact with the carbon fiber shell. Though effective. this solution would increase the weight and complexity of the internal metal skeleton. This concept is used in nature in examples like the cytoskeleton inside human cells and the "cancellous" or spongy bone core that connects to the outer compact bone that makes up mammalian skeletons.

The disclosure provides an alternate, lighter weight solution: in addition to the simple skin covered foam structure, other materials can be incorporated within, such as an aluminum foam with attached anchor bolts and plates. A variety of materials may be used. The foamed aluminum ranges on porosity but a typical example has approximately 30% of the strength but 10% of the weight of a similar volume of solid aluminum (the 90% weight difference being open voids).

Of particular advantage of the structures produced through the disclosed method of manufacture is that such voids are up to a centimeter in diameter and are somewhat interconnected making a contiguous series of complex channels, tubes and chambers. These are sufficiently large as to permit the ingress of liquid solutions such as polyurethane foams that may then expand and cure into solid structures of various and predictable durometer.

Alternatively, the metal structure could be porous with drilled holes large enough to permit ingress of an expanding foam yet provide a large surface area for the foam to bond with the metal.

This disclosure provides a strong, light weight alternative to existing aerospace materials even without the incorporation of metal structures. The formulation of the foam itself however is critical in that ideally it would have mechanical strength, rigidity, but also some ability to flex or expand.

The latter provides significant advantages over present foam methods. In all presently used foam filled structures, the foam is rigid or at least not sufficiently flexible to withstand being crushed. Such foam structures were used in the past to make various objects such as surf boards.

Though having the advantage of being relatively light, strong and quick to produce it was fundamentally flawed. If struck be a significant blow, especially over a small area, the foam below the skin would be permanently depressed. Now that area of skin was unsupported and would crack.

In addition, as the entire structure is rigid, if flexed beyond a certain point the entire structure would snap in half.

Disclosed here is an improvement on this design that incorporates a particular formulation of a rigid and a flexible foam. These materials, though often based on the same base polymer, such as polyurethane, are distinct chemistries, using different catalysts and components. They create vastly different chemical lattices, different polymeric chains; one being largely rigid, the other elastomeric.

For this reason, it is understood in the industry that they cannot be mixed together as they may interfere with the critical polymerization reaction. Also, they tend to proceed at very different rates and at different temperatures. The exothermic reaction of one potentially having a negative effect on the reaction of the other.

It was discovered that this was generally true, that mixing the different chemistries would result in a simply less rigid or less flexible version of the original. However, a limited number of formulations were discovered that were able to have both rigidity and flexibility, providing an unexpected result The resultant chemistry would expand similarly to each component separately but at the end of the reaction the structure maintained properties of both. Disclosed here is a method by which this combination of properties could be used to create a very light but strong structure.

If the volume contained by the mold and subsequently the cured outer non-stretchable skin is less than the calculated expansion volume of the cured expanding foam then, when complete, the structure remains under pressure. Somewhat akin to pumping up a car tire, the skin is now stretched over a strong but flexible volume that would like to expand further.

The strength is in part due to the foam itself and in part due to the fact that any compression of the out surface, trying to deflect the skin, is instantly transferred to the entire volume and inside surface.

However, the structure is not inflated like a tire and so cannot simply be punctured. The foam is in fact a complex structure of millions of minute carbon dioxide bubbles contained in the polymer.

In the literature of the prior art also teaches than when using expanding foams, they must be allowed to radiate heat for the reaction to proceed uniformly and most definitely allowed to vent through holes or voids where it can expand freely.

In this disclosure, again as an unexpected result, the foam is not permitted to vent, and the heat deliberately contained during the curing process. Because the foam maintains some of its flexibility, these bubbles are in a sense, always trying to expand and creating tension in the wall of each bubble.

The pressure within them is not close to atmospheric as with a foam permitted to expand freely or vent but directly related to the pressure created by the encasing mold and can therefore be up to hundreds of times higher.

These microscopic gas-filled spheres are the structural strength of the material. If a portion of the wall is pressed, the minor deflection of the outer skin transfers the force to the volume below. Because of the flexible nature this force, equivalent to adding pressure, is transferred to each and every sphere simultaneously thus distributing the force over a tremendous surface area.

In addition, because each sphere is essentially independent, the structure will maintain integrity even if penetrated by a sharp probe such as a high speed bullet. Though the bullet will rupture the spheres it passes though and the surrounding spheres, in fact the entire volume expands slightly to fill the space created.

A further advantage is that the exothermic reaction created by the expanding foam actually accelerates the curing of the fiber impregnated epoxy.

If the desired shape of the structure is known and a mold can therefore be made, then the manufacturing process can be reduced to a small number of simple steps. The structure can be a simple volume but could also be a plate, a disk, or a hollowed volume such as a tube or tunnel. These various components lend themselves to simple and rapid production of large lightweight structures, such as wings, rotors and bodies of drones, helicopters and fixed wing aircraft. When incorporated, the foamed aluminum comes in plates from a half an inch to several inches thick and 8 foot by 4 foot sheets. These may be easily cut, carved and welded to make a suitable internal structure with anchor points.

In one embodiment, a method of manufacturing a composite structure is disclosed, the method comprising: providing a mold to operate at a minimum internal pressure, the mold comprising at least one fluid conduit; lining a mold interior surface with a release agent; forming a first epoxy layer over the release agent; forming a first epoxy layer over the release agent; forming a first non-stretching fiber layer over the epoxy layer, the first non-stretching fiber layer formed in a defined pattern; forming a second non-stretching fiber layer, the second non-stretching fiber layer disposed over the first non-stretching fiber layer and comprising a second epoxy layer; disposing a first volume of a rigid and flexible polyurethane mixture into the mold; closing the mold to form a closed mold; adding a second volume of the rigid and flexible polyurethane mixture into the closed mold through the at least one fluid conduit to form a second working structure from the first working structure; stabilizing the second working structure; and opening the closed mold; wherein: the second working structure is a composite structure.

In one aspect, the defined pattern is a mesh weave pattern. In another aspect, the injection gas is air. In another aspect, the minimum internal pressure is 100 PSI. In another aspect, the method further comprises the step of at least partially filling the closed mold with an injection gas. In another aspect, the method further comprises the step of laying in at least one special structure in contact with the first working structure. In another aspect, the special structure is at least one of a fluid line and an electrical wire. In another aspect, the method further comprises the mold is a clam shell mold. In another aspect, the method further comprises the rigid and flexible polyurethane mixture comprises a greater volume of rigid polyurethane than flexible polyurethane. In another aspect, the method further comprises the rigid polyurethane is of a greater density than the flexible polyurethane. In another aspect, the method further comprises the composite structure forms a portion of an aerospace vehicle. In another aspect, the method further comprises the rigid polyurethane comprises a glass. In another aspect, the method further comprises the composite structure has a residual compressive stress on an exterior surface of the composite structure.

In another embodiment, a method of manufacturing a composite structure is disclosed, the method comprising: providing a mold to operate at a minimum internal pressure, the mold comprising at least one fluid conduit; lining a mold interior surface with a release agent; forming a first epoxy layer over the release agent; forming a first epoxy layer over the release agent; forming a first non-stretching fiber layer over the epoxy layer, the first non-stretching fiber layer formed in a defined pattern; forming a second non-stretching fiber layer, the second non-stretching fiber layer disposed over the first non-stretching fiber layer and comprising a second epoxy layer; disposing a first volume of a rigid and flexible polyurethane mixture into the mold, the rigid and flexible polyurethane mixture comprising a greater volume of rigid polyurethane than flexible polyurethane, the rigid polyurethane comprising a glass; closing the mold to form a closed mold; laying in at least one special structure in contact with the first working structure; adding a second volume of the rigid and flexible polyurethane mixture into the closed mold through the at least one fluid conduit to form a second working structure from the first working structure; stabilizing the second working structure; and opening the closed mold; wherein: the second working structure is a composite structure, the composite structure having a residual compressive stress on an exterior surface; and the special structure is at least one of a fluid line and an electrical wire.

In one aspect, the rigid and flexible polyurethane mixture comprises a greater volume of rigid polyurethane than flexible polyurethane. In another aspect, the rigid polyurethane is of greater density than the density of the flexible polyurethane.

In another embodiment, a method of manufacturing a composite structure is disclosed, the method comprising: providing a mold comprising at least one fluid conduit and a set of mold datums; lining a mold interior surface with a first epoxy layer; forming a first carbon fiber layer over the first epoxy layer; providing a shaped aluminum foam insert, the shaped aluminum foam comprising a set of anchor mechanisms; positioning the set of anchor mechanisms to align with at least one mold datum of the set of mold datums; connecting the at least one fluid conduit to the shaped aluminum foam insert; closing the mold to form a closed mold; injecting an expanding foam by way of the at least one fluid conduit into the shaped aluminum foam insert to eject excess epoxy from the shaped aluminum foam to form a second working structure; stabilizing the second working structure; and opening the closed mold; wherein: the second working structure is a composite structure.

In one aspect, the mold is a clam shell mold. In another aspect, the expanding foam comprises polyurethane. In another aspect, the composite structure forms a portion of an aerospace vehicle.

By way of providing additional background, context, and to further satisfy the written description requirements of 35 U.S.C. § 112, the following references are incorporated by reference in entirety: U.S. patent application Ser. No. 16/383,513 filed Apr. 12, 2019 and entitled "Rotary-Winged Vehicle Systems and Devices."

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "module" as used herein refers to any known or later developed hardware, software, firmware, artificial intelligence, fuzzy logic, or combination of hardware and software that can perform the functionality associated with that element.

The phrase "graphical user interface" or "GUI" means a computer-based display that allows interaction with a user with aid of images or graphics.

The term "computer-readable medium" as used herein refers to any storage and/or transmission medium that participate in providing instructions to a processor for execution. Such a computer-readable medium is commonly tangible, non-transitory, and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures.

It should be understood that the proportions and dimensions (either relative or absolute) of the various features and elements (and collections and groupings thereof) and the boundaries, separations, and positional relationships presented there between, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments. The following descriptions are not intended to limit the embodiments to one preferred embodiment. To the contrary, it is intended to cover alternatives, modifications, and equivalents as can be included within the spirit and scope of the described embodiments as defined, for example, by the appended claims.

Figure 1:
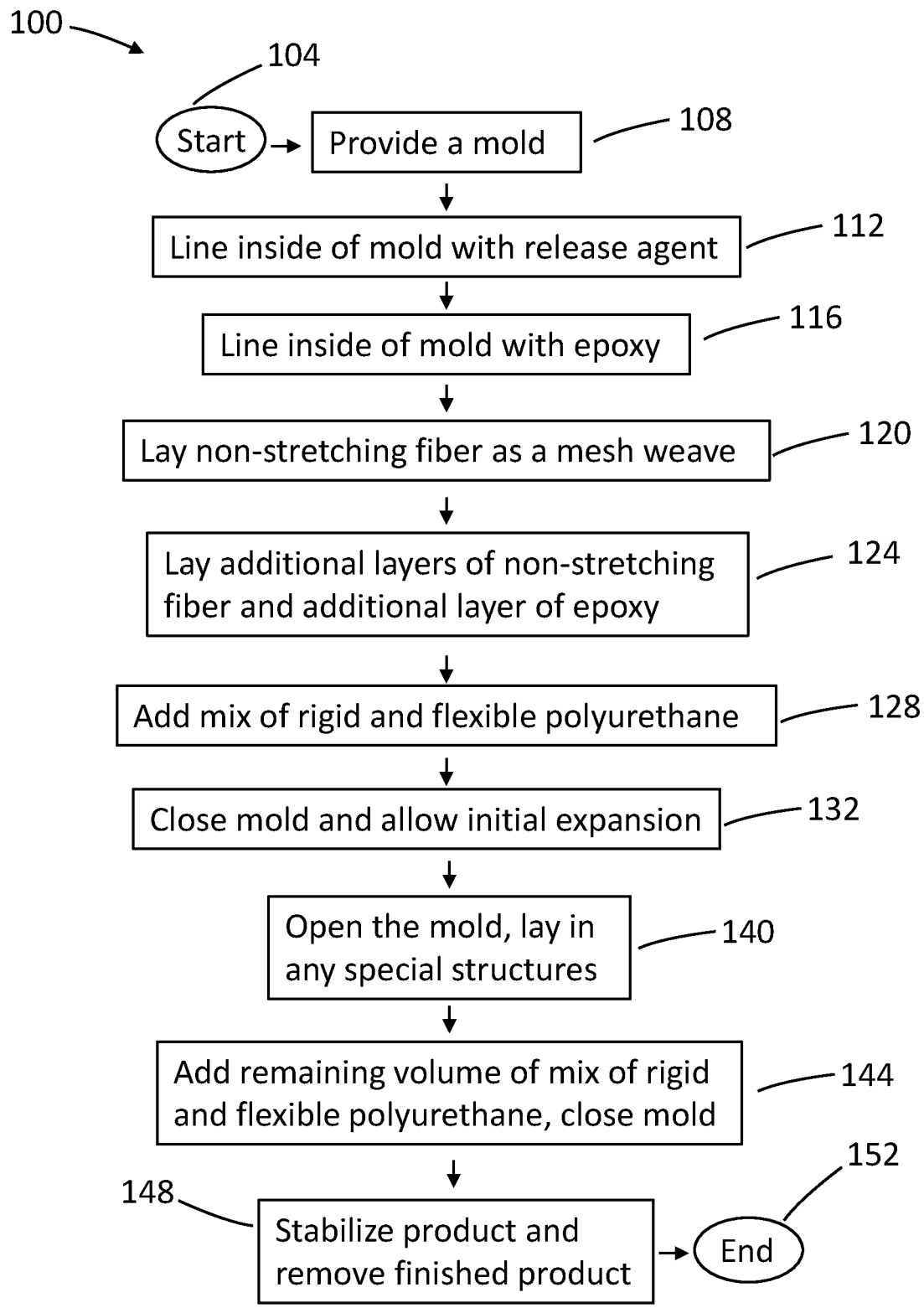
FIG. 1 shows a flowchart of one embodiment of a method of manufacturing an aerospace structure of the disclosure.
Figure 2:
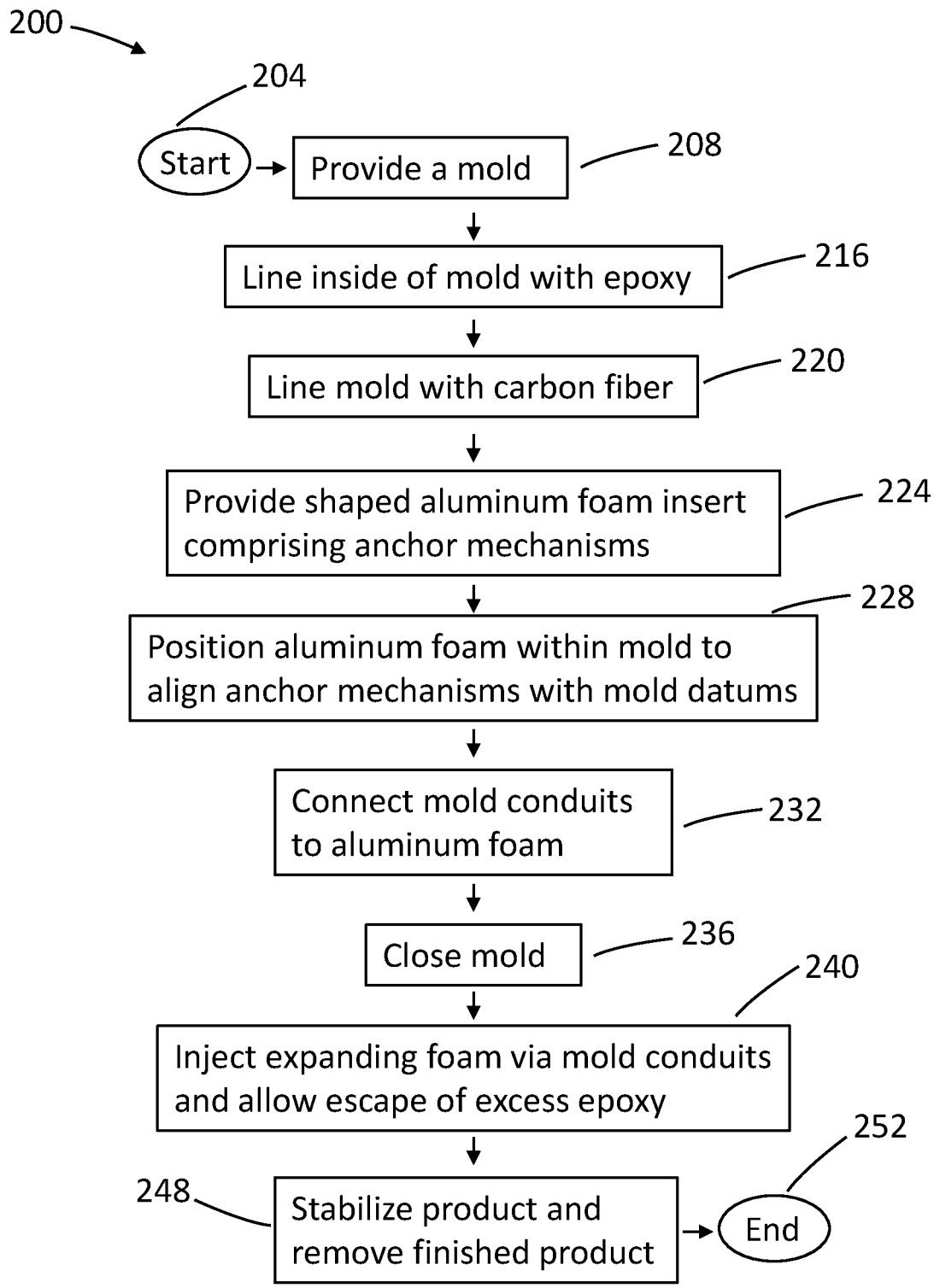
FIG. 2 shows a flowchart of another embodiment of a method of manufacturing an aerospace structure of the disclosure.

Each of FIGS. 1 and 2 describe embodiments of a method of manufacturing an aerospace structure. The method 100 of FIG. 1 and the method 200 of FIG. 2 share some similarities.

The term "carbon-fiber" or phrase "carbon fiber" means fibers made mostly of carbon which have properties desirable for many high-technology applications.

The term "mold" means a hollow container used to give shape to molten or hot liquid material (such as wax or metal) when it cools and hardens The term "polyurethane" means a synthetic resin in which the polymer units are linked by urethane groups.

The phrase "rigid polyurethane" or "rigid polyurethane foam" or "RPUF" means any closed-cell plastic.

The phrase "flexible polyurethane" means any open-cell plastic.

The phrase "non-stretching fiber" or "non-stretchable fiber" means a carbon fiber that generally resists deformation when under a tensile stress.

The term "epoxy" means any of a class of adhesives, plastics, or other materials that are polymers of epoxides, to include thermosetting resins capable of forming tight cross-linked polymer structures characterized by toughness, strong adhesion, and low shrinkage.

The term "resin" means any of a class of nonvolatile, solid or semisolid organic substances, as copal or mastic, which consist of amorphous mixtures of carboxylic acids The phrase "fiber material" means a carbon-fiber or carbon fiber material.

The term "weave" means a method of crossing fibers over and under each other that requires multiple strands in parallel and at least one that crosses the others.

The term "fluid" means a substance devoid of shape and yields to external pressure, to include liquids and gases, e.g., water and hydrocarbons in liquid or gaseous form, and combinations of liquids and gases.

The phrase "release agent" or "releasing agent" means a chemical used to prevent other materials from bonding to surfaces, such as to prevent other materials from bonding to the interior surface of a mold.

With attention to FIG. 1, a method of manufacturing 100 an aerospace structure is depicted. The flowchart or process diagram of FIG. 1 starts at step 104 and ends at step 152. Any of the steps, functions, and operations discussed herein can be performed continuously and automatically. The steps are notionally followed in increasing numerical sequence, although, in some embodiments, some steps may be omitted, some steps added, and the steps may follow other than increasing numerical order. The method of manufacturing 100 of FIG. 1 may be referred to as method 100.

Generally, the method 100 employs mix of rigid or stiff polyurethane with flexible polyurethane during one step of the method which, at the completion of the method of manufacturing, creates or yields a relatively lightweight yet strong structure. Such a use of a mixture of rigid polyurethane with flexible polyurethane is unconventional, discouraged, and generally taught away from due to any number of conventional rationales or beliefs. Conventional methods of manufacturing teaches that a rigid polyurethane interferes negatively or destructively with a flexible polyurethane because, e.g., both have exothermic properties which will work against one another. In addition, a rigid polyurethane versus a flexible polyurethane use different catalysts and components so as to result in a different polymeric molecule. Thus, the varied catalysts and components may interfere with each other. Also, conventional carbon fiber manufacturing techniques teach that the manufacturing process must remove heat to cure any carbon fiber of a structure. In contrast, the methods described in this disclosure deliberately contain or trap heat to cure the mixture of rigid polyurethane and flexible polyurethane, as well as the epoxy fiber outer coating After starting at step 104, the method 100 proceeds to step 108 wherein a mold is provided. The mold generally conforms to the shape of the intended completed structure. In one embodiment, the mold is a clam shell mold. In one embodiment, the mold is a set of plates, such as two plates that fit together. The mold may be any device that may be sealed, hold a pressure, and form a cavity configured to generally form the shape of the intended final structure. The mold is designed or rated to handle a targeted manufacturing internal (to the mold) pressure. In one embodiment, the mold is rated to operate or handle an internal pressure of up to several hundred PSI. In one embodiment, the mold is rated to operate or handle an internal pressure of at least 100 PSI. After the completion of step 108, the method proceeds to step 112.

At step 112, the mold is lined with a release agent. The release agent is selected to perform under at least the same targeted manufacturing internal (to the mold) pressure and heat as the mold. For example, if the mold is designed to operate to at least an internal pressure of 100 PSI, and 120 degree C., the release agent would be capable or rated or able to operate under conditions of at least 100 PSI and 120 degree C. After the completion of step 112, the method proceeds to step 116.

At step 116, a layer of epoxy is applied or layered over or on top of the release agent so as to form a smooth skin or smooth surface. Like the release agent, the layer of epoxy may be designed or rated to handle or operate or perform under at least the same targeted manufacturing internal (to the mold) pressure as the mold. In one embodiment, the epoxy is a resin. After completion of step 116, the method proceeds to step 120.

At step 120, a rigid or non-stretching fiber is applied or layered on top of the epoxy in a deliberate pattern, such as a mesh weave, glass weave, chopped configuration, or another pattern known to those skilled in the art. After completion of step 120, the method continues to step 124.

At step 124, one or more additional layers of a rigid or non-stretching fiber, and an additional layer of epoxy (and/or resin) are applied within the mold. (In one embodiment, one or more of steps 120 and 124 are deleted). After completion of step 124, the method proceeds to step 128.

At step 128, a mixture or blend of rigid polyurethane with flexible polyurethane is added to the mold. The mixture of rigid polyurethane with flexible polyurethane may be defined as a ratio of parts flexible polyurethane to parts rigid polyurethane, e.g. A parts flexible polyurethane and B parts rigid polyurethane. After completion of step 128, the method proceeds to step 132.

At step 132, the mold is closed and the products or substance within the mold are allowed to initially expand, thereby beginning to create an under pressure within the sealed mold. Note that the expansion is stopped or halted or restricted initially by the wall of the mold and then once cured, by the rigid or non-stretching fiber applied at step 124. The result is a formed product. That may have additional post processing steps such as painting or cladding or addition of logos. After completion of step 132, the method proceeds to step 140.

At step 140, the mold is opened, and any special structures are laid into or onto the formed working or interim product (as contained in the mold). Such special structures may include or more of electrical wires, fuel lines, attachment areas like flanges, and other such structures or devices known to those skilled in the art. In one embodiment, the mold is filled between 25% and 50% by volume before the special structures are added. After completion of step 140, the method proceeds to step 144.

At step 144, an additional volume or amount of the mixture of rigid polyurethane with flexible polyurethane of step 128 is added to the mold. The additional volume of the mixture of rigid polyurethane with flexible polyurethane is a function of the air density (so-called density altitude) of the manufacturing site. Stated another way, the additional volume of the mixture of rigid polyurethane with flexible polyurethane is a function of the elevation of the manufacturing site. (Note that the process of adding the rigid polyurethane with flexible polyurethane mixture into the mold typically involves at least two such additions—here, in method 100, in each of steps 128 and 144—because, for example, mixing a large volume of the rigid polyurethane with flexible polyurethane mixture can be challenging and/or impractical, even if special structures (at step 140) are not involved. In one embodiment, the additional volume of the rigid polyurethane with flexible polyurethane mixture is added just before the initial amount of the mixture has expanded to nearly the upper portion of the mold, e.g., a clam shell mold, then quickly close the mold and allow the additional expansion). At the completion of step 144, the method proceeds to step 148.

At step 148, the working product, as contained in the mold, is allowed to stabilize (as may be required, such as any curing or cooling or final finishing required) and the working product is removed to provide a finished, relatively lightweight yet strong structure. At the completion of step 148, the process proceeds to step 152, and the process ends.

In one embodiment, the method 100 includes a step of at least partially filling the mold with a gas such as air to push or squeeze out any excess air and/or epoxy residing in the mold. This step, if added, would occur after the initial expansion of step 132 is performed and/or before special structures are positioned (in step 140).

With attention to FIG. 2, another method of manufacturing 200 an aerospace structure is depicted. The flowchart or process diagram of FIG. 2 starts at step 204 and ends at step 252. Any of the steps, functions, and operations discussed herein can be performed continuously and automatically. The steps are notionally followed in increasing numerical sequence, although, in some embodiments, some steps may be omitted, some steps added, and the steps may follow other than increasing numerical order. The method of manufacturing 200 of FIG. 2 may be referred to as method 200.

After starting at step 204, the method 200 proceeds to step 208 wherein a mold is provided. This step is similar to step 108 of method 100. After completion of step 208, the method 200 proceeds to step 216.

At step 216, the inside of the mold is lined with epoxy, similar to step 116 of method 100. After completion of step 216, the method 200 proceeds to step 220.

At step 220, a carbon fiber material is disposed or placed over the epoxy of step 220. After completion of step 220, the method proceeds to step 224.

At step 224, a shaped aluminum foam insert is provided. The shaped aluminum foam insert comprises one or more anchor mechanisms. The one or more anchor mechanisms may be, in one embodiment, bonded or welded to the shaped aluminum foam insert, and may include plates, bolts, female threaded receptacles, hooks, wires, cables, and/or any system, technique or device that may be used to transfer forces from the outside to the inside, as known to those skilled in the art. After completion of step 224, the method proceeds to step 228.

At step 228, the shaped aluminum foam insert is positioned within the mold to align the anchor mechanisms with one or more mold datums or mold reference points or mold interest points. For example, the external "interface" of the one or anchors of the shaped aluminum foam insert may pass though predrilled holes in the mold (such as a clam shell mold) or be located near "thin" areas in the skin that may be easily penetrated during a later step of the method 200. As another example, wire and/or fluid connections may be present at particular mold datums or reference points that allow transmission of electrical power, signals, fluids and/or air through the body of the (manufactured) structure. Such a wire may thread from one edge to the other to power a landing light; such a fluid connection may be a fuel line that goes from the (manufactured) structure—an aircraft body— to an attached engine on a wing. After completion of step 228, the method proceeds to step 232.

At step 232, one or more mold conduits are connected to the shaped aluminum foam insert. The one or more mold conduits may connect to the shaped aluminum foam insert along one or more surfaces of the shaped aluminum foam insert, such as the side surfaces, upper surfaces, and/or lower surfaces. The one or more mold conduits may be a plurality or set of tubes or pipes with holes to allow easy egress of fluids such as polyurethane or other expanding foams. The one or more mold conduits exit the mold at some point and permit fluid to be pumped into the mold and the shaped aluminum foam insert. After completion of step 232, the method proceeds to step 236.

At step 236, the mold is closed. After completion of step 236, the method proceeds to step 240.

At step 240, expanding foam is injected into the mold and the worked structure (i.e., what is contained within the mold) by way of the one or more mold conduits. The injected foam enters the interstices and voids of the worked aluminum foam structure and also expands outward so as to squeeze the worked carbon fiber epoxy structure against the smooth surface of the mold. Excess epoxy is allowed to escape from predetermined holes on the mold, thereby leaving the worked carbon fiber epoxy structure with the correct ratio of epoxy to fiber to produce the ideal strength when cured.

Note that the complex interaction of the expanding foam and voids of the aluminum structure provide not only dramatically increased surface area for adhesion but "peg" shapes that mechanically lock the expanding foam to the aluminum. This approach greatly increases the dispersion of force from the anchor point to the aluminum and the aluminum to the foam and composite shell. After completion of step 236, the method proceeds to step 248.

At step 248, the working product, as contained in the mold, is allowed to stabilize (as may be required, such as any curing or cooling or final finishing required) and the working product is removed to provide a finished, relatively lightweight yet strong structure. At the completion of step 248, the process proceeds to step 252, and the process ends.

With this combination of materials and manufacturing method, an entire structure, such as a wing or body segment for even a very large vehicle, could be produced in only minutes and after curing, ready for painting and integration of attached components within hours.

Depending on the number and type of attachment mechanism used for each component, completion of a "ready to fly" structure such as a wing with attached engines, lights and moving flight control surfaces (e.g., ailerons) could be completed in a fraction of the time required using conventional methods of manufacturing.

The mechanical properties of the structures produced by the disclosed method of manufacturing, such as strength to weight ratio, is superior to similar structures made using tube and plate and carbon fiber "skin". Additionally, external coatings, such as thermal coatings or even metallic surfaces, may be included in the "mold" process. Fire resistant foams and alternate expandable materials such as gas infused liquids, even molten metals without composite skin, may be used instead of expanding polyurethane.

Although the disclosure describes methods of manufacturing as related to aerospace structures, the methods may be used for non-aerospace structures, e.g., automotive, nautical to include floating structures, green energy such as wind turbines, and any application or use where relatively lightweight yet strong structures are desirable, as known to those skilled in the art. The methods disclosed may generally be applied to any encasement.

The above embodiments may, in combination or separately, may utilize computer software and/or computer hardware (to include, for example, computer-readable mediums) for any of several functions such as automated control and state estimation, and furthermore may utilize one or more GUIs for human interaction with modules or elements or components.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The exemplary systems and methods of this disclosure have been described in relation to aerospace structures. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of manufacturing a composite structure comprising:
   providing a mold to operate at a minimum internal pressure, the mold comprising at least one fluid conduit;
   lining a mold interior surface with a release agent;
   forming a first epoxy layer over the release agent;
   forming a first non-stretching fiber layer over the first epoxy layer, the first non-stretching fiber layer formed in a defined pattern;
   forming a second non-stretching fiber layer, the second non-stretching fiber layer disposed over the first non-stretching fiber layer and comprising a second epoxy layer;
   disposing a first volume of a rigid and flexible polyurethane mixture into the mold;
   closing the mold to form a closed mold and to form a first working structure;
   adding a second volume of the rigid and flexible polyurethane mixture into the closed mold through the at least one fluid conduit to form a second working structure from the first working structure;
   stabilizing the second working structure; and
   opening the closed mold; wherein:
   the rigid and flexible polyurethane mixture comprises a greater volume of rigid polyurethane than flexible polyurethane; and
   the second working structure is a composite structure.

2. The method of claim 1, wherein the defined pattern is a mesh weave pattern.

3. The method of claim 1, further comprising the step of at least partially filling the closed mold with an injection gas.

4. The method of claim 1, wherein the minimum internal pressure is 100 PSI.

5. The method of claim 3, wherein the injection gas is air.

6. The method of claim 1, further comprising the step of laying in at least one special structure in contact with the first working structure.

7. The method of claim 6, wherein the at least one special structure is at least one of a fluid line and an electrical wire.

8. The method of claim 6, wherein the mold is a clam shell mold.

9. The method of claim 6, wherein the at least one special structure is at least one of a fluid line, an electrical wire, and a flange.

10. The method of claim 9, wherein the rigid polyurethane is of a greater density than the flexible polyurethane.

11. The method of claim 1, wherein the composite structure forms a portion of an aerospace vehicle.

12. The method of claim 1, wherein the rigid polyurethane comprises a glass.

13. The method of claim 1, wherein the composite structure has a residual compressive stress on an exterior surface of the composite structure.

14. A method of manufacturing a composite structure comprising:
    providing a mold to operate at a minimum internal pressure, the mold comprising at least one fluid conduit;
    lining a mold interior surface with a release agent;
    forming a first epoxy layer over the release agent;
    forming a first non-stretching fiber layer over the first epoxy layer, the first non-stretching fiber layer formed in a defined pattern;
    forming a second non-stretching fiber layer, the second non-stretching fiber layer disposed over the first non-stretching fiber layer and comprising a second epoxy layer;
    disposing a first volume of a rigid and flexible polyurethane mixture into the mold, the rigid and flexible polyurethane mixture comprising a greater volume of rigid polyurethane than flexible polyurethane, the rigid polyurethane comprising a glass;
    closing the mold to form a closed mold and to form a first working structure;
    laying in at least one special structure in contact with the first working structure;
    adding a second volume of the rigid and flexible polyurethane mixture into the closed mold through the at least one fluid conduit to form a second working structure from the first working structure;
    stabilizing the second working structure; and
    opening the closed mold; wherein:
    the second working structure is a composite structure, the composite structure having a residual compressive stress on an exterior surface; and
    the at least one special structure is at least one of a fluid line and an electrical wire.

15. The method of claim 14, wherein the defined pattern is a mesh weave pattern.

16. The method of claim 14, wherein the rigid polyurethane is of greater density than the density of the flexible polyurethane.

17. A method of manufacturing a composite structure comprising:

providing a mold comprising at least one fluid conduit and a set of mold datums;
lining a mold interior surface with a first epoxy layer;
forming a first carbon fiber layer over the first epoxy layer;
providing a shaped aluminum foam insert, the shaped aluminum foam comprising a set of anchor mechanisms;
positioning the set of anchor mechanisms to align with at least one mold datum of the set of mold datums;
connecting the at least one fluid conduit to the shaped aluminum foam insert;
closing the mold to form a closed mold;
injecting an expanding foam by way of the at least one fluid conduit into the shaped aluminum foam insert to eject excess epoxy from the shaped aluminum foam to form a second working structure;
stabilizing the second working structure; and
opening the closed mold; wherein:
the second working structure is a composite structure.

18. The method of claim 17, wherein the mold is a clam shell mold.

19. The method of claim 17, wherein the expanding foam comprises polyurethane.

20. The method of claim 17, wherein the composite structure forms a portion of an aerospace vehicle.

* * * * *